(12) United States Patent
Naniwa et al.

(10) Patent No.: US 9,153,275 B1
(45) Date of Patent: Oct. 6, 2015

(54) LASER-INTEGRATED HEAD GIMBAL ASSEMBLY HAVING LASER CONTACT PROTECTION

(71) Applicant: HGST Netherlands B.V., Amsterdam (NL)

(72) Inventors: Irizo Naniwa, Fujisawa (JP); Shigeo Nakamura, Odawara (JP); Kenji Suzuki, Fujisawa (JP); Takuya Matsumoto, Hachioji (JP); Harukazu Miyamoto, Higashi-murayama (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/514,790

(22) Filed: Oct. 15, 2014

(51) Int. Cl.
*G11B 13/04* (2006.01)
*G11B 5/48* (2006.01)

(52) U.S. Cl.
CPC .............. *G11B 13/04* (2013.01); *G11B 5/4826* (2013.01)

(58) Field of Classification Search
None
See application file for complete search history.

(56) References Cited

U.S. PATENT DOCUMENTS

| | | | | |
|---|---|---|---|---|
| 5,027,241 A * | 6/1991 | Hatch et al. | | 360/255 |
| 5,386,331 A * | 1/1995 | Wolter | | 360/245.3 |
| 5,844,752 A * | 12/1998 | Bozorgi et al. | | 360/244.9 |
| 5,875,071 A * | 2/1999 | Erpelding et al. | | 360/244.3 |
| 5,877,921 A * | 3/1999 | Coon et al. | | 360/245.4 |
| 5,894,381 A * | 4/1999 | Allen et al. | | 360/244.9 |
| 5,953,180 A * | 9/1999 | Frater et al. | | 360/97.12 |
| 6,115,221 A * | 9/2000 | Utsunomiya | | 360/245.1 |
| 6,208,486 B1 * | 3/2001 | Gustafson et al. | | 360/98.08 |
| 6,614,627 B1 * | 9/2003 | Shimizu et al. | | 360/294.4 |
| 6,738,226 B1 * | 5/2004 | Bhattacharya et al. | | 360/245.9 |
| 7,876,646 B2 | 1/2011 | Tanaka et al. | | |
| 8,111,486 B2 | 2/2012 | Suh et al. | | |
| 8,179,745 B2 | 5/2012 | Nakamura et al. | | |
| 8,248,892 B2 | 8/2012 | Shimazawa et al. | | |
| 8,270,262 B2 | 9/2012 | Naniwa et al. | | |
| 8,395,972 B2 | 3/2013 | Sasaki et al. | | |
| 2003/0039074 A1 * | 2/2003 | Erpelding | | 360/244.2 |
| 2010/0007980 A1 | 1/2010 | Kim et al. | | |
| 2011/0228651 A1 | 9/2011 | Gage et al. | | |
| 2012/0314548 A1 | 12/2012 | Seigler et al. | | |
| 2013/0107678 A1 | 5/2013 | Mukoh et al. | | |
| 2013/0322221 A1 * | 12/2013 | Naniwa et al. | | 369/13.33 |

FOREIGN PATENT DOCUMENTS

| | | |
|---|---|---|
| JP | 2008-243296 | 10/2008 |
| JP | 2009-43377 | 2/2009 |
| JP | 2009-054206 | 3/2009 |
| JP | 2009-187645 | 8/2009 |

(Continued)

OTHER PUBLICATIONS

Naniwa et al., WO 2012/114460 A1, published Aug. 30, 2012.*

*Primary Examiner* — Peter Vincent Agustin
(74) *Attorney, Agent, or Firm* — John D. Henkhaus (57) ABSTRACT

A heat-assisted magnetic recording (HAMR) head gimbal assembly (HGA) protects the associated HAMR heating source from unwanted contact, such as from contact with an adjacent HAMR laser in response to a shock event. The HGA is configured such that the distance between the flexure and the top of a load beam flange is greater than the height of a submount associated with the heating source, and the height of the submount may also be greater than the height of the heating source, thus protecting against contact between adjacent heating sources.

20 Claims, 3 Drawing Sheets

(56) References Cited

FOREIGN PATENT DOCUMENTS

| JP | 2010-040112 | 2/2010 |
| JP | 2010-211875 | 9/2010 |
| JP | 2010-277637 | 12/2010 |
| WO | 2012114460 | 8/2012 |

* cited by examiner

LASER-INTEGRATED HEAD GIMBAL ASSEMBLY HAVING LASER CONTACT PROTECTION

FIELD OF EMBODIMENTS

Embodiments of the invention may relate generally to hard disk drives and more particularly to a laser-integrated head gimbal assembly (HGA).

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution, and has led to the necessary development and implementation of various means for reducing the disk area needed to record a bit of information. It has been recognized that one significant challenge with minimizing bit size is based on the limitations imposed by the superparamagnetic effect whereby, in sufficiently small nanoparticles, the magnetization can randomly flip direction under the influence of thermal fluctuations.

Heat-assisted magnetic recording (HAMR) [which may also be referred to as energy-assisted magnetic recording (EAMR) or thermal-assisted magnetic recording (TAR)] is a known technology that magnetically records data on high-stability media using, for example, laser thermal assistance to first heat the media material. HAMR takes advantage of high-stability, high coercivity magnetic compounds, such as iron platinum alloy, which can store single bits in a much smaller area without being limited by the same superparamagnetic effect that limits the current technology used in hard disk drive storage. However, at some capacity point the bit size is so small and the coercivity correspondingly so high that the magnetic field used for writing data cannot be made strong enough to permanently affect the data and data can no longer be written to the disk. HAMR solves this problem by temporarily and locally changing the coercivity of the magnetic storage medium by raising the temperature above the Curie temperature, at which the medium effectively loses coercivity and a realistically achievable magnetic write field can write data to the medium.

One approach to HAMR designs is to utilize a semiconductor laser system to heat the media to lower its coercivity, whereby the optical energy is transported from the laser to the slider ABS via a waveguide and is concentrated to a nanometer-sized spot utilizing a near field transducer (NFT). More detailed information about the structure and functionality of a thermally assisted magnetic write head employing an NFT can be found in U.S. Pat. No. 8,351,151 to Katine et al., the disclosure of which is incorporated by reference in its entirety for all purposes as if fully set forth herein.

The performance of a HAMR system is largely affected by the performance of the associated laser. Therefore, inhibiting the degradation of the laser power over time is desirable for optimal performance of such a system. Furthermore, head gimbal assembly (HGA) components such as a flexure and a load beam and the HAMR laser module interact with each other in an environment having very limited mechanical clearances. HDD customers typically mandate meeting stringent performance requirements, including operational shock (or "op-shock") requirements, which generally relate to an HDD's operational resistance to, or operational tolerance of, a shock event. Thus the limited mechanical clearances associated with the HGA pose a challenge to meeting such requirements.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a heat-assisted magnetic recording (HAMR) head gimbal assembly (HGA) that protects the associated HAMR heating source from unwanted contact, such as from contact with an adjacent HAMR laser in response to a shock event. The HGA is configured such that the distance between the flexure and the top of a load beam flange is greater than the height of a submount associated with the heating source, and the height of the submount may also be greater than the height of the heating source, thus protecting against contact between adjacent heating sources.

According to an embodiment, the flange comprises a raised portion whose top is the high point of the load beam flange and, therefore, the aforementioned top of the load beam flange. The location, shape and configuration of the flange raised portion may vary, according to various embodiments.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a heat-assisted magnetic recording (HAMR) head gimbal assembly (HGA) that protects the associated HAMR heating source from unwanted contact are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Environments

Figure 1:
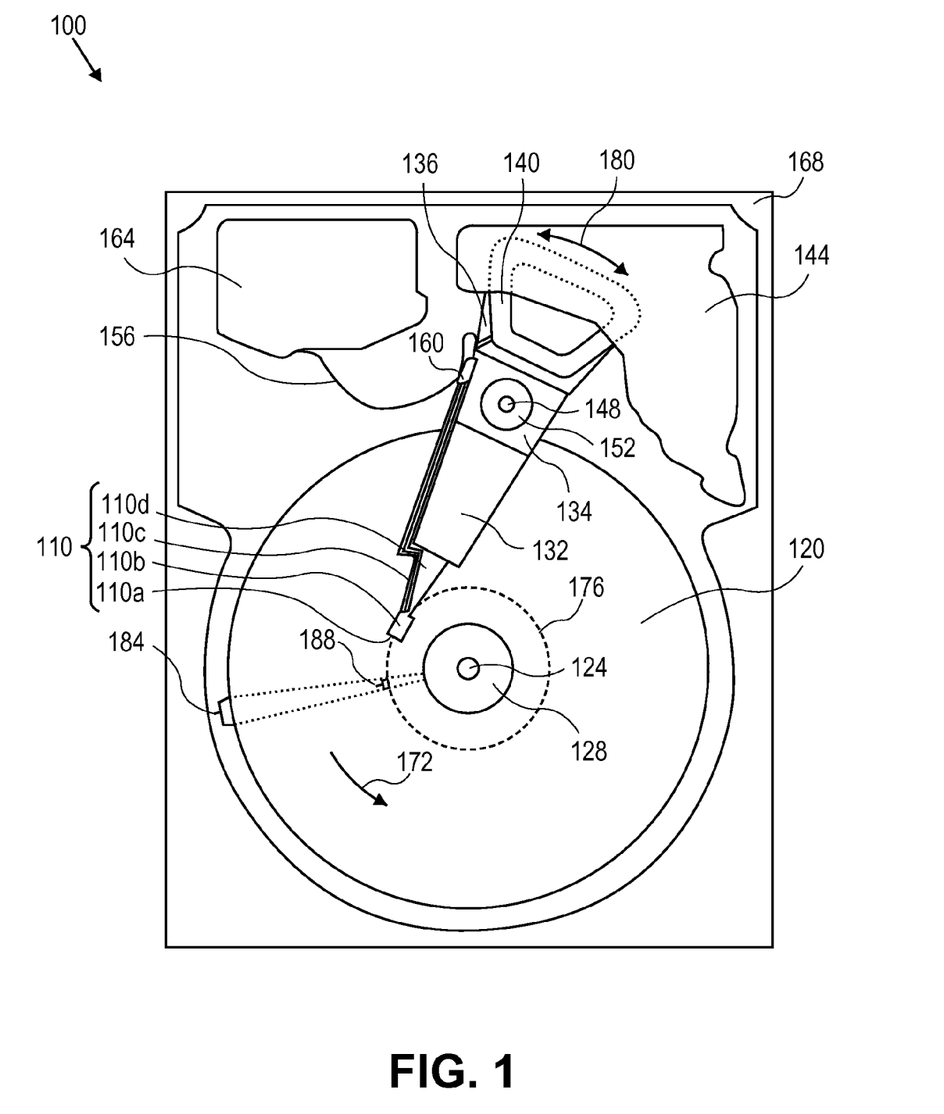
FIG. 1 is a plan view illustrating a hard disk drive, according to an embodiment.

Embodiments of the invention may be used in the context of a HAMR HGA in a hard-disk drive (HDD) storage device. Thus, in accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110, to access portions of the media 120, being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As mentioned, the performance of a HAMR system is largely affected by the performance of the associated laser, and head gimbal assembly (HGA) components including the HAMR laser module are positioned in an environment having very limited mechanical clearances. Thus the limited mechanical clearances associated with the HGA pose a challenge to meeting op-shock requirements.

Figure 2:
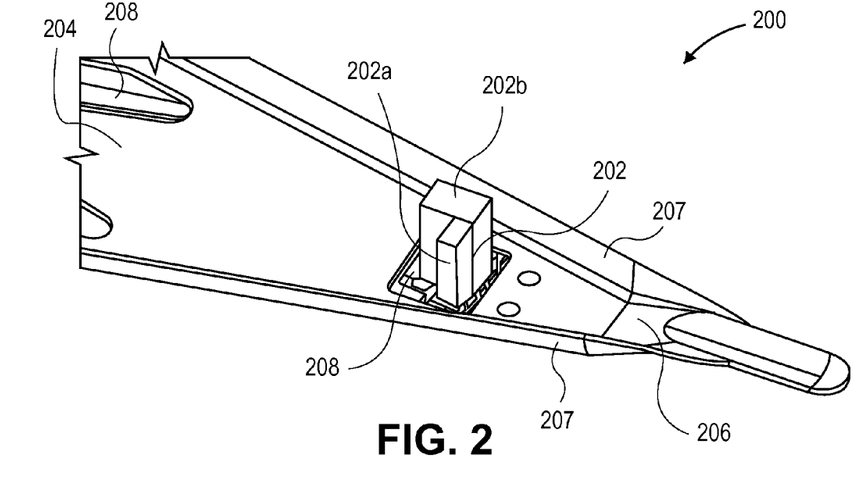
FIG. 2 is a partial perspective view illustrating a semiconductor laser module mounted on a suspension, according to an embodiment.

FIG. 2 is a partial perspective view of a semiconductor laser module mounted on a suspension, according to an embodiment. FIG. 2 illustrates an assembly 200 in which semiconductor laser module 202, comprising a semiconductor laser 202a and a sub-mount 202b, is coupled with a suspension 204. According to an embodiment, the semiconductor laser 202a comprises a laser diode. For non-limiting examples, the substrate material of the submount 202b may be aluminum nitride or silicon.

An HDD includes at least one head gimbal assembly (HGA) that includes a slider that houses the read/write head, and a suspension such as suspension 204. Each slider is coupled to the free end of a suspension that in turn is cantilevered from the rigid arm of an actuator. Several semi-rigid arms may be combined to form a single movable unit, a head stack assembly (HSA), having either a linear bearing or a rotary pivotal bearing system. The suspension 204 typically includes a relatively stiff load beam 206 with a mount plate (or "base plate") at the base end, which subsequently attaches to the actuator arm, and whose free end mounts a flexure 208 that carries the slider and its read/write head.

For a HAMR design, the laser sub-mount 202b is typically bonded to a flexure bonding surface of the slider, whereby the emitting surface of the corresponding laser 202a faces the flexure bonding surface of the slider. A hole is formed in both the flexure 208 and the load beam 206, and the laser module 202 is passed through these holes for coupling with the slider. A hole is formed in both the flexure and the load beam in this example, but notches may be formed instead of holes. A metal film may be deposited over the entire bonding surface of the submount 202b with the laser 202a, whereby this metal film is electrically connected to one of the electrodes of the laser 202a. According to an embodiment, laser sub-mount 202b is electrically and mechanically connected to flexure 208 of suspension 204 via an electrically conductive solder junction, e.g., using a solder ball jet process as is known in the art. A flange 207 is fabricated typically by bending the sides of the load beam 206. With a previous configuration and as depicted in FIG. 2 the laser 202a protrudes above this flange 207, when viewed from the side.

Figure 3:
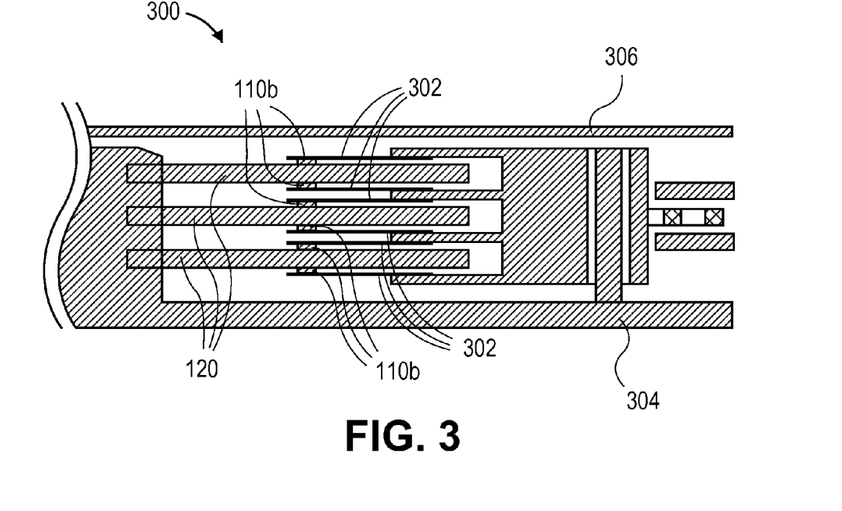
FIG. 3 is a partial cross-sectional side view illustrating an HDD, according to an embodiment.

FIG. 3 is a partial cross-sectional side view illustrating an HDD, according to an embodiment. HDD 300 comprises one or more disk 120 and a slider 110b attached to the HGA 302. Each slider 110b flies over a side of a disk 120. Therefore, a pair of HGAs 302 (pointing UP head and pointing DN head) is inserted between adjacent disks, and/or one HGA 302 (with UP head) is inserted between the housing base 304 and a disk 120, and/or one HGA 302 (with DN head) is inserted between the cover 306 and a disk 120.

Thus, when a laser-integrated HAMR HGA having a previous configuration is mounted in an HDD, shocks and vibrations may cause a collision between the adjacent lasers (e.g., laser 202a of FIG. 2) in the UP head and the DN head, or between the laser in the DN head and the cover 306, or between the laser in the UP head and the base 304, thereby causing damage to the laser.

Laser-Integrated Head Gimbal Assembly with Laser Contact Protection

Figure 4A:
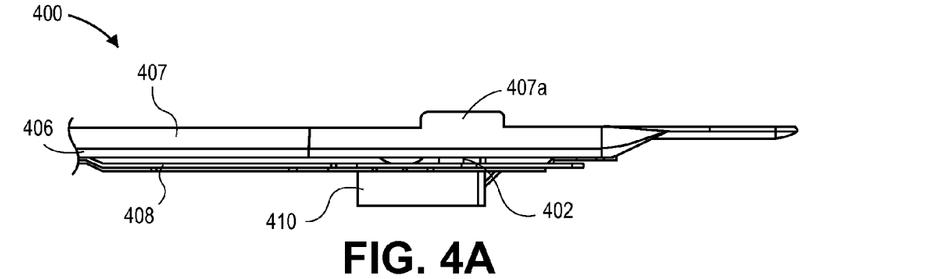
FIG. 4A is a side view illustrating a laser-integrated HGA, according to an embodiment.

FIG. 4A is a side view illustrating a laser-integrated HGA, according to an embodiment. HGA 400 comprises a load beam 406 comprising an edge flange 407, which is bent upward from the main load beam body (see, e.g., load beam 206 of FIG. 2 for perspective). HGA 400 further comprises a flexure 408 movably coupled with the load beam 406 via a gimbal. A head slider 410 is coupled with the flexure 408 and, as discussed in reference to FIG. 1, houses a magnetic write head (see, e.g., head 110a of FIG. 1) that is configured to write to a magnetic disk (see, e.g., disk 120 of FIG. 1 and FIG. 3).

HGA 400, configured for HAMR, further comprises a laser module 402 coupled with the head slider 410, where the laser module 402 includes a submount (see, e.g., submount 202b of FIG. 2) and a laser (see, e.g., laser 202a of FIG. 2) coupled to the submount. As illustrated in the side view of FIG. 4A, the laser module 402 is barely visible in the gap between the bottom of the load beam 406 and the top of the flexure 408, and is blocked from view above the load beam 406 by flange 407. Thus, according to an embodiment, the distance between the flexure 408 and the top of the flange 407 near the laser module 402 is greater than the height of the submount. Consequently, a collision or contact between the laser module 402 and, for example, an adjacent laser module mounted to an adjacent head slider, is largely inhibited and/or eliminated.

Further, according to an embodiment, the height of the submount is greater than the height of the laser, further inhibiting and/or eliminating the possibility of contact between the laser (e.g., 202a) and, for example, an adjacent laser mounted to a submount on an adjacent head slider. In some implementations, a sensor may be mounted in a laser-integrated HAMR HGA to measure the strength of the laser beam. In such a scenario, damage to the sensor by a shock event can be prevented by ensuring that the height of the sensor also does not exceed the height of the flange 407.

According to an embodiment, and as illustrated in FIG. 4A, the top of the flange 407 of load beam 406, near the laser module 402, is a raised portion 407a of the flange 407. Therefore, according to a foregoing embodiment, the distance between the flexure 408 and the top of the flange 407 near the laser module 402, i.e., the top of the raised portion 407a of flange 407, is greater than the height of the submount. According to an embodiment, a raised portion such as raised portion 407a is substantially quadrilateral-shaped, e.g., rectangular or square shaped. According to an embodiment, the raised portion 407a of the flange 407 extends from the main body of the flange in a substantially co-planar direction.

According to another embodiment, and as illustrated in FIG. 4A, the raised portion 407a of the flange 407 is adjacent to the laser module in a transverse direction (i.e., the direction into/out of the view of FIG. 4A). Such a raised portion 407a may be fabricated, for a non-limiting example, by forming a suitably shaped sheet for the load beam 406 which includes a feature corresponding to the raised portion 407a at the desired position, whereby the shaped sheet is stamped or bent, for example, to form the flange 407 including the raised portion 407a. Alternatively and for another non-limiting example, the load beam 406, flange 407 and raised portion 407a could be a molded plastic or the like.

Figure 4B:
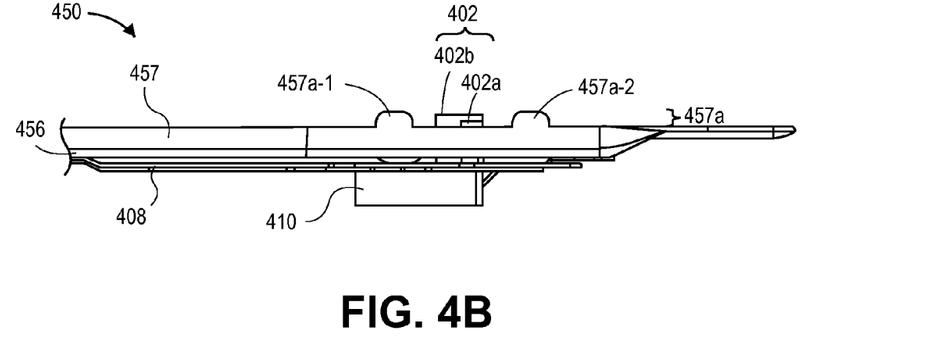
FIG. 4B is a side view illustrating a laser-integrated HGA, according to an embodiment.

FIG. 4B is a side view illustrating a laser-integrated HGA, according to another embodiment. HGA 450 comprises a load beam 456 comprising an edge flange 457, which is bent upward from the main load beam body (see, e.g., load beam 206 of FIG. 2 for perspective). HGA 450 further comprises a flexure 408 movably coupled with the load beam 456 via a gimbal. A head slider 410 is coupled with the flexure 408 and, as discussed in reference to FIG. 1, houses a magnetic write head (see, e.g., head 110a of FIG. 1) that is configured to write to a magnetic disk (see, e.g., disk 120 of FIG. 1 and FIG. 3).

HGA 450, configured for HAMR, further comprises a laser module 402 coupled with the head slider 410, where the laser module 402 includes a submount 402b and a laser 402a coupled to the submount. According to this embodiment and similar to a foregoing embodiment, the distance between the flexure 408 and the top of the flange 457 near the laser module 402 is greater than the height of the submount 402b. Consequently, a collision or contact between the laser module 402 and, for example, an adjacent laser module mounted to an adjacent head slider, is largely inhibited and/or eliminated. Further, according to an embodiment, the height of the submount 402b may be slightly greater than the height of the laser 402a, further inhibiting and/or eliminating the possibility of contact between the laser and, for example, an adjacent laser mounted to a submount on an adjacent head slider.

According to an embodiment, the top of the flange 457 of load beam 456, near the laser module 402, includes one or more raised portion 457a of the flange 457, positioned on either side of the laser module 402 in the longitudinal direction (i.e., the left/right direction of the view of FIG. 4B). According to an embodiment, and as illustrated in FIG. 4B, the top of the flange 457 of load beam 456 includes multiple (two shown for purposes of clarity and example) raised portions 457a-1, 457a-2 of the flange 457, where one raised portion 457a-1 is positioned on one side of the laser module 402 and another raised portion 457a-2 is positioned on the other opposing side of the laser module 402 in the longitudinal direction. Therefore, according to a foregoing embodiment, the distance between the flexure 408 and the top of the flange 457 near the laser module 402, i.e., the top of the raised portions 457a-1 and 457a-2 of flange 457, is greater than the height of the submount 402b. Furthermore, such a raised one or more portion 457a may be fabricated, for a non-limiting example, similarly to as described for embodiments in reference to FIG. 4A.

According to an embodiment, the raised portion(s) 457a of the flange 457 extends from the main body of the flange in a substantially co-planar direction. According to an embodiment, a raised portion such as raised portions 457a-1, 457a-2 is substantially semicircular-shaped. However, the shape of each raised portion of each embodiment may vary from implementation to implementation based on, for example, design and/or manufacturing goals and constraints, and the like. Therefore, the embodiments described in reference to FIG. 4A and the embodiments described in reference to FIG. 4B may be implemented to comprise a raised portion having a quadrilateral, semicircular, or any other suitable shape or shapes.

Figure 5A:
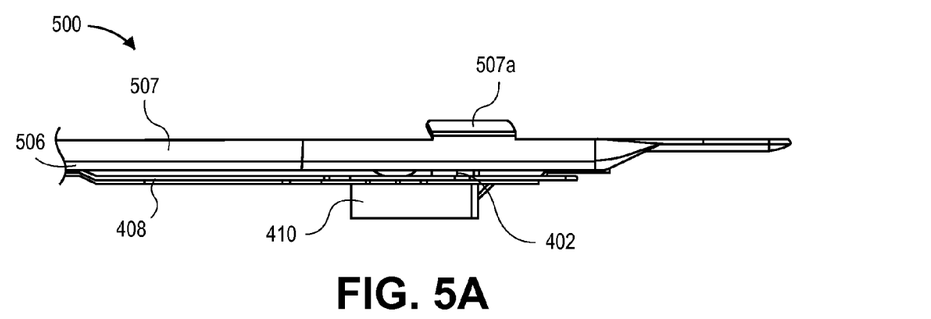
FIG. 5A is a side view illustrating a laser-integrated HGA, according to an embodiment.

FIG. 5A is a side view illustrating a laser-integrated HGA, according to an embodiment. HGA 500 comprises a load beam 506 comprising an edge flange 507, which is bent upward from the main load beam body (see, e.g., load beam 206 of FIG. 2 for perspective). HGA 500 further comprises a flexure 408 movably coupled with the load beam 506 via a gimbal. A head slider 410 is coupled with the flexure 408 and, as discussed in reference to FIG. 1, houses a magnetic write head (see, e.g., head 110a of FIG. 1) that is configured to write to a magnetic disk (see, e.g., disk 120 of FIG. 1 and FIG. 3).

HGA 500, configured for HAMR, further comprises a laser module 402 coupled with the head slider 410, where the laser module 402 includes a submount (see, e.g., submount 202b of FIG. 2) and a laser (see, e.g., laser 202a of FIG. 2) coupled to the submount. As illustrated in the side view of FIG. 5A, the laser module 402 is barely visible in the gap between the bottom of the load beam 506 and the top of the flexure 408, and is blocked from view above the load beam 506 by flange 507. Thus, according to an embodiment, the distance between the flexure 408 and the top of the flange 507 near the laser module 402 is greater than the height of the submount. Consequently, a collision or contact between the laser module 402 and, for example, an adjacent laser module mounted to an adjacent head slider, is largely inhibited and/or eliminated. Further, according to an embodiment, the height of the submount is greater than the height of the laser, further inhibiting and/or eliminating the possibility of contact between the laser (e.g., 202a) and, for example, an adjacent laser mounted to a submount on an adjacent head slider.

According to an embodiment, and as illustrated in FIG. 5A, the top of the flange 507 of load beam 506, near the laser module 402, is a raised portion 507a of the flange 507. Therefore, according to a foregoing embodiment, the distance between the flexure 408 and the top of the flange 507 near the laser module 402, i.e., the top of the raised portion 507a of flange 507, is greater than the height of the submount. According to an embodiment, a raised portion such as raised portion 507a may be substantially quadrilateral-shaped, e.g., rectangular or square shaped.

According to another embodiment, the raised portion 507a extends from the flange 507 in a substantially linear direction and manner, at an angle from the main body of the flange, rather than extending from the main body of the flange in a co-planar direction. Therefore, additional protection of the laser is provided because the angled or bent portion, i.e., the raised portion 507a of the flange 507, acts like a spring in response to a shock event. According to another embodiment, and as illustrated in FIG. 5A, the raised portion 507a of the flange 507 is adjacent to the laser module in a transverse direction. Such a raised portion 507a may be fabricated, for a non-limiting example, similarly to as described for embodiments in reference to FIG. 4A.

Figure 5B:
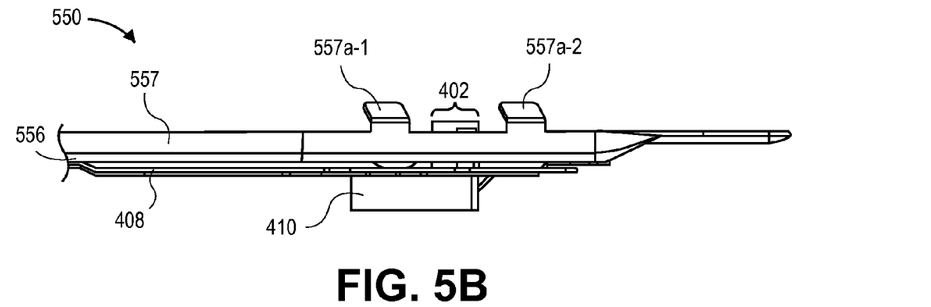
FIG. 5B is a side view illustrating a laser-integrated HGA, according to an embodiment.

FIG. 5B is a side view illustrating a laser-integrated HGA, according to an embodiment. HGA 550 comprises a load beam 556 comprising an edge flange 557, which is bent upward from the main load beam body (see, e.g., load beam 206 of FIG. 2 for perspective). HGA 550 further comprises a flexure 408 movably coupled with the load beam 556 via a gimbal. A head slider 410 is coupled with the flexure 408 and, as discussed in reference to FIG. 1, houses a magnetic write head (see, e.g., head 110a of FIG. 1) that is configured to write to a magnetic disk (see, e.g., disk 120 of FIG. 1 and FIG. 3).

HGA 550, configured for HAMR, further comprises a laser module 402 coupled with the head slider 410, where the laser module 402 includes a submount 402b and a laser 402a coupled to the submount. According to this embodiment and similarly to a foregoing embodiment, the distance between the flexure 408 and the top of the flange 557 near the laser module 402 is greater than the height of the submount 402b. Consequently, a collision or contact between the laser module 402 and, for example, an adjacent laser module mounted to an adjacent head slider, is largely inhibited and/or eliminated.

Further, according to an embodiment, the height of the submount 402b may be slightly greater than the height of the laser 402a, further inhibiting and/or eliminating the possibility of contact between the laser and, for example, an adjacent laser mounted to a submount on an adjacent head slider.

According to an embodiment, the top of the flange 557 of load beam 556, near the laser module 402, includes one or more raised portion 557a of the flange 557, positioned on either side of the laser module 402 in the longitudinal direction (i.e., the left/right direction of the view of FIG. 5B). According to an embodiment, and as illustrated in FIG. 5B, the top of the flange 557 of load beam 556 includes multiple (two shown for purposes of clarity and example) raised portions 557a-1, 557a-2 of the flange 557, where one raised portion 557a-1 is positioned on one side of the laser module 402 and another raised portion 557a-2 is positioned on the other opposing side of the laser module 402 in the longitudinal direction. Therefore, according to a foregoing embodiment, the distance between the flexure 408 and the top of the flange 557 near the laser module 402, i.e., the top of the raised portions 557a-1 and 557a-2 of flange 557, is greater than the height of the submount 402b. Furthermore, such a raised one or more portion 557a may be fabricated, for a non-limiting example, similarly to as described for embodiments in reference to FIG. 4A.

According to another embodiment, the raised portion(s) 557a of the flange 557 extends from the flange 557 in a substantially linear direction and manner, and the end of the raised portion(s) 557a is angled or bent in another direction. For example, the raised portion(s) 557a may extend from the flange 557 either co-planar with the main body of the flange 507 from which the raised portion(s) 557a extends, or at an angle from the main body of the flange, and then bends at an angle in another direction. Therefore, additional protection of the laser is provided because the angled or bent portion, i.e., the raised portion(s) 557a of the flange 557, acts like a spring in response to a shock event.

According to an embodiment, a raised portion such as raised portions 557a-1, 557a-2 is substantially quadrilateral-shaped. However, the shape of each raised portion of each embodiment may vary from implementation to implementation based on, for example, design and/or manufacturing goals and constraints, and the like. Therefore, the embodiments described in reference to FIG. 5A and the embodiments described in reference to FIG. 5B may be implemented to comprise a raised portion having a quadrilateral, semicircular, or any other suitable shape or shapes. Furthermore, while the embodiments described in reference to FIG. 5A and FIG. 5B are illustrated as having raised portions 507a, 557a-1, 557a-2, respectively, angling inward, a similar effect can be achieved when the ends are angled/bent outward.

Although the embodiments described herein are described in the context of a HAMR HGA, there are other contexts and environments in which embodiments may be beneficially implemented. For example, in thinner, lower profile hard disk drives (e.g., 7 mm height or thinner), perhaps also having multiple recording disks, there would exist a narrow spacing between an adjacent UP head and DN head and, therefore, the possibility of collision of the heads is relatively high. Thus, the teachings provided herein may provide benefits to such a system by inhibiting and/or avoiding collision between adjacent heads.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A heat-assisted magnetic recording (HAMR) head gimbal assembly (HGA) comprising:
   a load beam comprising an edge flange, said flange comprising a main body;
   a flexure movably coupled with said load beam;
   a head slider coupled with said flexure and comprising a magnetic write head configured to write to a magnetic-recording disk; and
   a laser module coupled with said slider, said laser module comprising a submount and a laser coupled to said submount;
   wherein the distance between said flexure and the top of said flange near said laser module is greater than the height of said submount to protect said laser module from contact;
   wherein said top of said flange near said laser module is a raised portion of said flange extending from said main body of said flange.

2. The HAMR HGA of claim 1, wherein said height of said submount is greater than the height of said laser.

3. The HAMR HGA of claim 1, wherein said raised portion of said flange is adjacent to said laser module in a transverse direction.

4. The HAMR HGA of claim 1, wherein said raised portion of said flange comprises one or more raised portion on either side of said laser module in a longitudinal direction.

5. The HAMR HGA of claim 4, wherein said one or more raised portion of said flange comprises a first raised portion on one side of said laser module and a second raised portion on the other side of said laser module in the longitudinal direction.

6. The HAMR HGA of claim 1, wherein said raised portion of said flange is substantially quadrilateral-shaped.

7. The HAMR HGA of claim 1, wherein said raised portion of said flange is substantially semicircular-shaped.

8. The HAMR HGA of claim 1, wherein said raised portion of said flange extends from said main body of said flange in a substantially linear direction at an angle from said main body of said flange.

9. The HAMR HGA of claim 1, wherein said raised portion of said flange extends from said main body of said flange in a linear direction and the end of said raised portion is bent in another direction.

10. A hard disk drive comprising:
 a disk media rotatably mounted on a spindle;
 a heat-assisted magnetic recording (HAMR) head gimbal assembly (HGA) comprising:
  a load beam comprising an edge flange, said flange comprising a main body,
  a flexure movably coupled with said load beam,
  a head slider coupled with said flexure and comprising a magnetic write head configured to write to said disk media,
  a laser module coupled with said slider, said laser module comprising a submount and a laser coupled to said submount, and
  wherein the distance between said flexure and the top of said flange near said laser module is greater than the height of said submount to protect said laser module from contact,
  wherein said top of said flange near said laser module is a raised portion of said flange extending from said main body of said flange; and
 a voice coil motor configured to move said HGA for said head slider to access portions of said disk media.

11. The hard disk drive of claim 10, wherein said height of said submount is greater than the height of said laser.

12. The hard disk drive of claim 10, wherein said raised portion of said flange is adjacent to said laser module in a transverse direction.

13. The hard disk drive of claim 10, wherein said raised portion of said flange comprises one or more raised portion on either side of said laser module in a longitudinal direction.

14. The hard disk drive of claim 13, wherein said one or more raised portion of said flange comprises a first raised portion on one side of said laser module and a second raised portion on the other side of said laser module in the longitudinal direction.

15. The hard disk drive of claim 10, wherein said raised portion of said flange is substantially quadrilateral-shaped.

16. The hard disk drive of claim 10, wherein said raised portion of said flange is substantially semicircular-shaped.

17. The hard disk drive of claim 10, wherein said raised portion of said flange extends from said main body of said flange in a substantially linear direction.

18. The hard disk drive of claim 10, wherein said raised portion of said flange extends from said main body of said flange in a linear direction and the end of said raised portion is bent in another direction.

19. A method of manufacturing a heat-assisted magnetic recording (HAMR) head gimbal assembly (HGA), the method comprising:
 movably coupling a flexure with a load beam comprising a flange, wherein said flange of said load beam comprises a main body and a raised portion extending from said main body;
 coupling a head slider with said flexure; and
 coupling a laser module with said slider, wherein said laser module comprises a submount and a laser coupled to said submount;
 wherein the top of said raised portion of said flange near said laser module is higher than said laser module to protect the laser module from contact.

20. The method of claim 19, wherein movably coupling said flexure with said load beam includes movably coupling said flexure with said load beam that comprises said raised portion of said flange extending from said main body of said flange in a substantially linear direction at an angle from said main body of said flange.

\* \* \* \* \*